United States Patent [19]
Walraven et al.

[11] Patent Number: 5,964,957
[45] Date of Patent: *Oct. 12, 1999

[54] METHOD FOR STRIPPING OPTICAL FIBERS BY HYDRATION AND DEHYDRATION

[75] Inventors: Claude Eugene Walraven, Longpond; Robert Gordon Wiley, Henryville, both of Pa.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,142

[22] Filed: Oct. 25, 1996

[51] Int. Cl.⁶ .................................. B08B 3/00; B08B 7/00
[52] U.S. Cl. .............................. 134/26; 134/19; 430/262; 385/53; 385/54; 385/55; 523/332
[58] Field of Search ........................ 134/19, 26; 430/262; 523/332; 385/53, 54, 55

[56] References Cited

U.S. PATENT DOCUMENTS

| | | | |
|---|---|---|---|
| 4,312,571 | 1/1982 | Ganzhorn | 134/2 |
| 4,954,152 | 9/1990 | Hsu et al. | 65/395 |
| 5,359,681 | 10/1994 | Jorgenson et al. | 385/12 |

*Primary Examiner*—Frank C. Eisenschenk
*Assistant Examiner*—Ali R. Salimi

[57] ABSTRACT

The present invention discloses a method for stripping an optical fiber cable having a polymer coating and an optical fiber using hydration and dehydration techniques. A section of optical fiber cable is first immersed in a hydrating agent, thereby hydrating the corresponding section of polymer coating and causing it to swell. The hydrated polymer coating is then rapidly heated to a fragmentation temperature causing the polymer coating to dehydrate and fragment. Subsequently, the dehydrated polymer coating is re-hydrated using the hydrating agent to separate the polymer coating from the optical fiber.

10 Claims, 2 Drawing Sheets

| Virgin Optical Fiber | Hydrated and Dehydrated Optical Fiber |
|---|---|
| 15.90 | 15.40 |
| 15.60 | 14.80 |
| 15.60 | 15.20 |
| 15.50 | 15.20 |
| 15.60 | 16.00 |
| 15.80 | 15.00 |
| 15.80 | 14.90 |
| 13.10 | 14.60 |
| 15.90 | 14.20 |
| 15.30 | 12.60 |
| 15.40 | 14.70 |
| 15.70 | 13.40 |
| 15.20 | 15.50 |
| 10.50 | 15.20 |
| 15.10 | 14.70 |
| 15.50 | 12.60 |
| 15.70 | 15.00 |
| 15.80 | 15.00 |
| 15.90 | 14.40 |
| 16.00 | 15.10 |
| 15.30 | 14.80 |
| 15.50 | 15.40 |
| 14.60 | 13.00 |
| 15.00 | 14.70 |
| 14.80 | 15.30 |
| 15.20 | 14.90 |
| 15.10 | 13.60 |
| 15.80 | 15.20 |
| 15.10 | 15.60 |
| 16.00 | 14.20 |
| 14.80 | 15.60 |
| 15.30 | 13.70 |
| 15.60 | 15.60 |
| 15.10 | 14.70 |
| 15.60 | 11.70 |
| 15.60 | 15.30 |
| 15.40 | 15.50 |
| 15.30 | 12.00 |
| 15.50 | 11.80 |
| 15.20 | 15.20 |
| 15.20 | 15.70 |
| 15.60 | 14.50 |
| 14.90 | 15.70 |
| 15.10 | 15.30 |
| 15.40 | 15.10 |
| 15.30 | 15.50 |
| 15.10 | 15.10 |
| 15.40 | 13.70 |
| 15.50 | 15.80 |
| 15.20 | 14.70 |
| Average = 15.27 | Average = 14.65 |
| Standard Deviation = 0.83 | Standard Deviation = 1.06 |

Testing was conducted using an Instron 1000 Tension Tester and AT&T DC optical fibers. The above numbers reflect the tensile strength of the AT&T DC optical fiber in pounds.

FIGURE 2

METHOD FOR STRIPPING OPTICAL FIBERS BY HYDRATION AND DEHYDRATION

CROSS-REFERENCES

The present invention is related to commonly assigned patent application Ser. No. 08/738,403 filed on even date herewith, entitled "A Method for Heat Stripping Optical Fibers," by same inventors.

GOVERNMENT CONTRACT

This invention is made with government support. The government has certain rights in this invention.

BACKGROUND OF THE INVENTION

1. Field of the Invention

The present invention relates generally to wire stripping and, in particular, to stripping polymer coatings from optical fibers.

2. Background of the Related Art

Optical fibers are subject to tensile strength degradation when their polymer coatings are removed or stripped. Prior art methods for removing an optical fiber's polymer coating include mechanical stripping and acid stripping, as the terms are known in the art. Mechanical stripping involves using a stripping tool, which is similar to a wire stripper, to remove the polymer coating from the optical fiber. The stripping tool cuts through the polymer coating and typically nicks or scratches the optical fiber causing degradation in its tensile strength, thereby reducing the optical fiber's longevity. For example, an optical fiber with a tensile strength of 15–16 pounds is typically reduced to 3–5 pounds after mechanical stripping. Minimizing tensile strength degradation is important particularly in situations where high repair costs make longevity a system requirement.

The primary prior art method for removing an optical fiber's polymer coating with minimal degradation in tensile strength is acid stripping using a hot Sulfuric Nitric mixture, i.e., 95% Sulfuric acid and 5% Nitric acid. Specifically, this prior art method involves heating the Sulfuric Nitric mixture to approximately 185° C., immersing the optical fiber in the hot Sulfuric Nitric mixture for approximately 20 seconds, and rinsing the optical fiber for 2–10 seconds in a rinser, such as Acetone, Alcohol, Methanol, purified water, or a combination of these. Although tensile strength degradation is minimized, this prior art method has certain safety concerns. Field technicians employing acid stripping methods require well-ventilated areas, such as laboratory environments with exhaust hoods, and protective gear to safeguard themselves from fumes and burns associated with acids. However, such facilities are generally not readily available to the field technicians. Accordingly, there exist a need for a method for removing a polymer coating from an optical fiber in a safe manner while minimizing tensile strength degradation.

SUMMARY OF THE INVENTION

The present invention discloses a method for removing polymer coatings from optical fibers in a safe manner while minimizing tensile strength degradation of the optical fibers. In one embodiment of the present invention, hydration and dehydration techniques are used to strip the polymer coatings from the optical fibers. Specifically, a section of polymer coating is hydrated using a hydrating agent, such as methylene chloride, to create a hydrated polymer coating section. Subsequently, the hydrated polymer coating section is dehydrated using a heat source to heat the hydrated polymer coating section at a rate equal to or greater than a fragmentation rate to a fragmentation temperature to create a dehydrated polymer coating section. Upon fragmentation, the dehydrated polymer coating section is re-hydrated using in the hydrating agent causing the polymer coating section to separate from the underneath optical fiber, thereby exposing the optical fiber so it could be cleaved and spliced.

BRIEF DESCRIPTION OF THE DRAWINGS

The features, aspects, and advantages of the present invention will become better understood with regard to the following description, appended claims, and accompanying drawings where:

FIG. 2 depicts a table containing results from a series of optical fiber tensile strength degradation tests applying the present invention.

DETAILED DESCRIPTION

Figure 1:
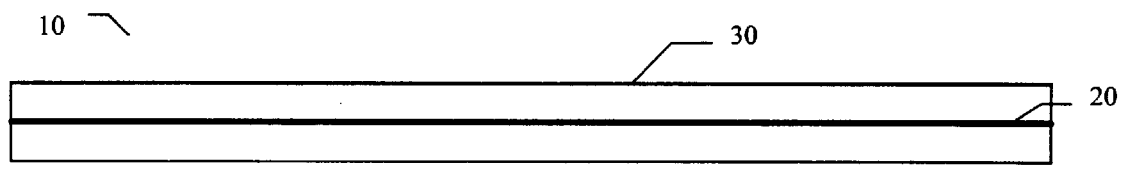
FIG. 1 depicts a typical optical fiber cable used in accordance with the present invention.

The present invention is a method for stripping polymer coatings from optical fibers in a safe manner while minimizing tensile strength degradation of the optical fibers. Essentially, the present invention method utilizes hydration and dehydration techniques for stripping the polymer coatings from the optical fibers.

Referring to FIG. 1, there is illustrated an optical fiber cable 10 used in accordance with the present invention. As shown in FIG. 1, the optical fiber cable 10 comprises an optical fiber 20 and a polymer coating 30. To strip the polymer coating 30 from the optical fiber 20, the optical fiber cable 10 is first hydrated by immersing the optical fiber cable 10 in a hydrating agent for a predetermined time period referred to herein as a immersion period. The hydrating agent is a solution capable of hydrating the polymer coating 30 and preferably causing the polymer coating to swell away from the underneath optical fiber 20. The duration of the immersion period is the amount of time required for the hydrating agent to hydrate the polymer coating. The immersion period will vary according to the hydrating agent being used and the polymer coating being hydrated.

In one embodiment of the present invention, the hydrating agent is a solution containing a concentration of methylene chloride capable of hydrating the polymer coating. In addition to the methylene chloride, the hydrating agent preferably includes a concentration of acids, such as acetic acid, formic acid and benzenesulfonic acid, capable of breaking down or cracking the polymer coating thereby increasing the surface area of the polymer coating such that the methylene chloride can hydrate the polymer coating quicker. In an embodiment of the present invention, the hydrating agent is a solution sold by Dynaloy, Inc. under the trademark "Dynasolve 165," and the immersion period using Dynasolve 165 is approximately one minute.

After the optical fiber cable 10 has been immersed in the hydrating agent for the duration of the immersion period, the polymer coating will have swelled and, in some cases, the polymer coating 30 will start separating from the optical fiber 20. For safety reasons, e.g., prevention of injuries associated with the hydrating agent coming into contact with a person, the optical fiber cable 10 is cleansed of the hydrating agent using a rinser. Typical rinsers include, but is not limited to, acetone, alcohol, methanol, purified water, or a combination of these.

The next step of the present invention is the dehydration process. The dehydration process involves using a heat source to heat the hydrated section of polymer coating at a fragmentation rate to a fragmentation temperature. The fragmentation rate is a minimum rate of temperature increase for the polymer coating that will cause the dehydrated polymer coating to expand and not burn, and the fragmentation temperature is a minimum temperature that will cause the hydrated section of polymer coating to dehydrate and fragment into several pieces. In the embodiment of the present invention where Dynasolve 165 is used as the hydrating agent, the fragmentation temperature is approximately 270° C.

The heat source is operable to heat the hydrated polymer coating at the fragmentation rate to the fragmentation temperature. In one embodiment, the heat source is an apparatus operable to generate forced air at or above the fragmentation temperature, such as a heat shrink gun. Note that heating the hydrated section of polymer coating to a temperature above the fragmentation temperature will cause fragments of polymer coating to burn and fuse to the optical fiber, whereas heating the hydrated section of polymer coating to a temperature below the fragmentation temperature will not dehydrate the polymer coating. In one embodiment of the present invention, the heat source is a heat shrink gun rated at 1500 watts operable to generate forced air at a temperature near or above 270° C. approximately three inches from the nozzle of the heat shrink gun.

Upon completion of the dehydration process, the dehydrated strip of polymer coating is re-immersed in the hydrating agent causing most or all of the dehydrated section of polymer coating to fall off and expose the underneath optical fiber. In the embodiment using Dynasolve 165, this step of re-immersing is completed in approximately 30–60 seconds. The hydrating agent is subsequently cleansed from the optical fiber cable with the rinser and any polymer coating that did not fall off in the re-immersion step can be blown off using compressed air or the heat shrink gun, thereby readying the optical fiber 20 to be cleaved and spliced to other optical fibers. Note that the hydrating agent in which the strip of polymer coating is re-immersed may be different from the hydrating agent in which the strip of polymer coating was originally immersed.

Advantageously, the present invention is safer than prior art acid stripping methods involving hot Sulfuric Nitric mixtures. Furthermore, unlike prior art mechanical stripping methods, the present invention minimizes tensile strength degradation since no nicks or scratches are being made on the optical fiber. Referring to FIG. 2, there is illustrated a table containing results from a series of tests conducted using depressed clad (DC) optical fibers sold by AT&T and a tension tester sold under the trademark "Instron 1000." As shown in table 50 of FIG. 2, the tension strength degradation resulting from the present invention is minimal in comparison to the tensile strength degradation resulting from mechanical stripping methods. Note that typical mechanical stripping methods reduce a 14–16 pound tensile strength optical fiber to a 3–5 pound tensile strength optical fiber.

Although the present invention has been described in considerable detail with reference to certain embodiments, other versions are possible. Therefore, the spirit and scope of the present invention should not be limited to the description of the embodiments contained herein.

The invention claimed is:

1. A method for stripping an optical fiber cable having a polymer coating and an optical fiber, the method comprising the steps of:

hydrating a section of polymer coating along the optical fiber cable using a first hydrating agent having methylene chloride to create a hydrated polymer coating section;

dehydrating the hydrated polymer coating section using a heat source generating forced air at least at a fragmentation temperature to create a dehydrated polymer coating section, the fragmentation temperature being approximately 270 degrees Celsius; and re-hydrating the dehydrated polymer coating section using a second hydrating agent having methylene chloride to separate the section of polymer coating being re-hydrated from the optical fiber without mechanical stripping.

2. The method of claim 1, wherein the step of hydrating comprises the step of:

immersing the section of polymer coating in the first hydrating agent for an immersion period, the immersion period being a duration of time at which the first hydrating agent can hydrate the polymer coating section.

3. The method of claim 1 comprising the additional step of:

cleansing the first hydrating agent from the polymer coating section being hydrated to remove the hydrating agent residing on the polymer coating.

4. The method of claim 3, wherein the step of cleansing comprises the step of:

rinsing the first hydrating agent from the polymer coating section being hydrated using a solvent.

5. The method of claim 1 comprising the additional step of:

cleansing the second hydrating agent from the dehydrated polymer coating section being re-hydrated to remove the hydrating agent residing on the polymer coating.

6. The method of claim 5, wherein the step of cleansing comprises the step of:

rinsing the second hydrating agent from the dehydrated polymer coating section being re-hydrated using a solvent.

7. The method of claim 1, the step of hydrating comprises the step of:

immersing the section of polymer coating in a solution having a concentration of methylene chloride that will hydrate the polymer coating section.

8. The method of claim 7, wherein the step of hydrating comprises the step of:

immersing the section of polymer coating in a solution having a concentration of an acid that will break down the polymer coating thereby increasing surface area of the polymer coating.

9. The method of claim 1, wherein the step of dehydrating comprises the step of:

heating the hydrated polymer coating section at a rate equal to or greater than the fragmentation rate to at least a fragmentation temperature using the heat source, the fragmentation rate being a minimum rate of temperature increase for the hydrated polymer coating section that will cause the hydrated polymer coating section to expand and not burn.

10. The method of claim 1, wherein the first and second hydrating agents are identical.

* * * * *